(12) United States Patent
Scott et al.

(10) Patent No.: US 8,028,510 B2
(45) Date of Patent: Oct. 4, 2011

(54) LINK FOR A LINEAR ACTUATOR

(75) Inventors: Jon Scott, Vancouver (CA); Eric Fetchko, Burnaby (CA)

(73) Assignee: Teleflex Canada Inc., Richmond (CA)

( * ) Notice: Subject to any disclaimer, the term of this patent is extended or adjusted under 35 U.S.C. 154(b) by 380 days.

(21) Appl. No.: 12/395,522

(22) Filed: Feb. 27, 2009

(65) Prior Publication Data

US 2009/0211220 A1 Aug. 27, 2009

Related U.S. Application Data

(60) Provisional application No. 61/031,786, filed on Feb. 27, 2008.

(51) Int. Cl.
F16G 13/20 (2006.01)
E05F 11/06 (2006.01)
B60J 5/06 (2006.01)

(52) U.S. Cl. ............... 59/78; 59/78.1; 59/84; 174/72 A; 474/230; 49/324; 49/325; 49/506; 52/108; 296/155

(58) Field of Classification Search ............. 59/78, 78.1, 59/84; 52/108; 49/324, 325, 506; 474/230; 174/72 A; 296/155

See application file for complete search history.

(56) References Cited

U.S. PATENT DOCUMENTS

| | | | |
|---|---|---|---|
| 980,181 A | 1/1911 | Asbury | |
| 1,221,471 A | 4/1917 | Miller | |
| 1,945,357 A | 1/1934 | Pierce | |
| 1,965,285 A | 7/1934 | Gilstad | |
| 2,005,727 A | 6/1935 | Benbow et al. | |
| 3,234,698 A * | 2/1966 | Kimblern | 52/108 |
| 3,742,775 A | 7/1973 | Hayes et al. | |
| 4,210,031 A | 7/1980 | Schmid | |
| 4,521,993 A * | 6/1985 | Tacheny et al. | 49/325 |
| 4,719,840 A | 1/1988 | Goodell et al. | |
| 4,819,495 A | 4/1989 | Hormann | |
| 4,941,316 A * | 7/1990 | Bechtold | 59/78 |
| 5,271,182 A | 12/1993 | Greisner | |
| 5,355,643 A * | 10/1994 | Bringolf | 52/108 |
| 6,530,177 B1 | 3/2003 | Sorensen | |
| 6,787,702 B2 * | 9/2004 | Suzuki | 174/72 A |
| 7,082,722 B1 | 8/2006 | Sorensen | |
| 2008/0199295 A1 | 8/2008 | Scott et al. | |
| 2008/0200294 A1 | 8/2008 | Scott et al. | |

FOREIGN PATENT DOCUMENTS

| | | |
|---|---|---|
| EP | 1 484 465 | 12/2004 |
| GB | 422 781 | 1/1935 |
| GB | 466 786 | 6/1937 |
| GB | 2 159 600 | 12/1985 |
| WO | WO 2005/033455 | 4/2005 |
| WO | WO 2005/108821 | 11/2005 |

* cited by examiner

*Primary Examiner* — David Jones
(74) *Attorney, Agent, or Firm* — Cameron IP

(57) ABSTRACT

A link for a chain, which is used in a linear actuator, comprises a base member and a plate pivotably mounted on the base member. An arm extends from the plate. A first connecting means is disposed on a distal end of the arm to connect the link with a first adjacent link. The plate has a protrusion for releasably engaging a second adjacent link. A second connecting means is disposed on the base member to connect the link with the second adjacent link.

7 Claims, 8 Drawing Sheets

US 8,028,510 B2

LINK FOR A LINEAR ACTUATOR

CROSS REFERENCE TO RELATED APPLICATION

This application claims the benefit of provisional application 61/031,786 filed in the United States Patent and Trademark Office on Feb. 27, 2008, the disclosure of which is incorporated herein by reference and priority to which is claimed.

BACKGROUND OF THE INVENTION

The present invention relates to a single chain linear actuator and, in particular, to a link for a single chain linear actuator.

Linear actuators having a single extending and retracting chain are well known in the art. Examples of single chain linear actuators are disclosed in International Application No. PCT/DK2004/000682 to Andersen et al., and International Application No. PCT/EP2005/004449 to Soerensen. The actuator chain comprises a plurality of inter-connected links with each link being pivotably connected to an adjacent link. This allows the chain to be displaced along a curved chain track, or chain path, as the chain is moved between an extended position and a retracted position. The chain track or chain path is typically disposed within an actuator housing.

The links are further provided with means to prevent pivoting when the links are aligned along a common axis outside the actuator housing. This ensures an actuator with good axial and side load stiffness. However, it also increases the number of components required thereby increasing manufacturing costs.

SUMMARY OF THE INVENTION

It is an object of the present invention to provide an improved link for a single chain linear actuator.

There is accordingly provided a link for a chain which is used in a linear actuator. The link comprises a base member and a plate pivotably mounted on the base member. An arm extends from the plate. A first connecting means is disposed on a distal end of the arm to connect the link with a first adjacent link. The plate has a protrusion for releasably engaging a second adjacent link. A second connecting means is disposed on the base member to connect the link with the second adjacent link.

The link has a simplified structure to restrict pivoting when the link is aligned along a longitudinal aligned along a common longitudinal axis outside the actuator housing.

BRIEF DESCRIPTION OF THE DRAWING

Referring to the drawings.

DETAILED DESCRIPTION OF THE PREFERRED EMBODIMENT

Figure 1:
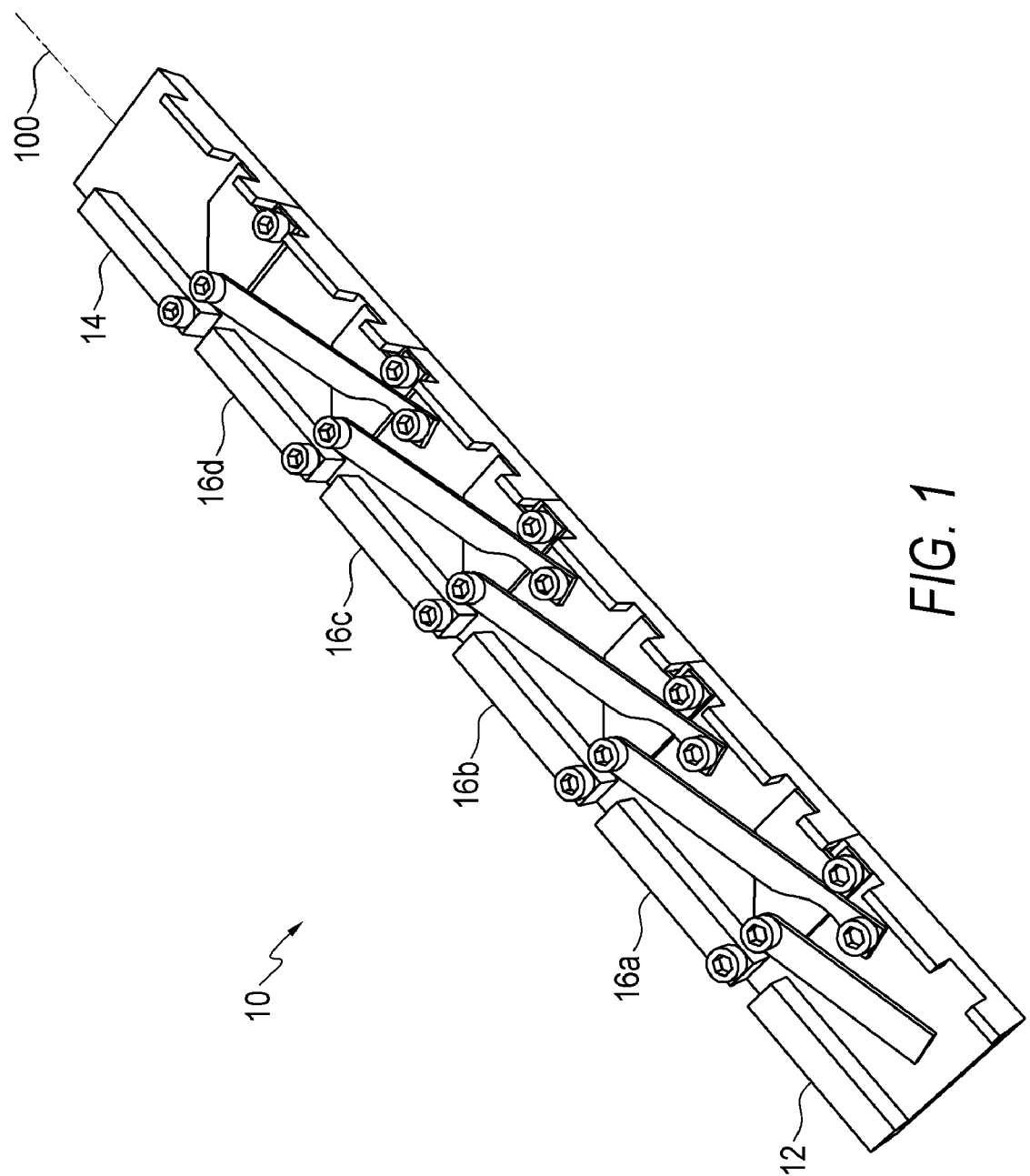
FIG. 1 is a top perspective view of a chain for use in a linear actuator.
Figure 6:
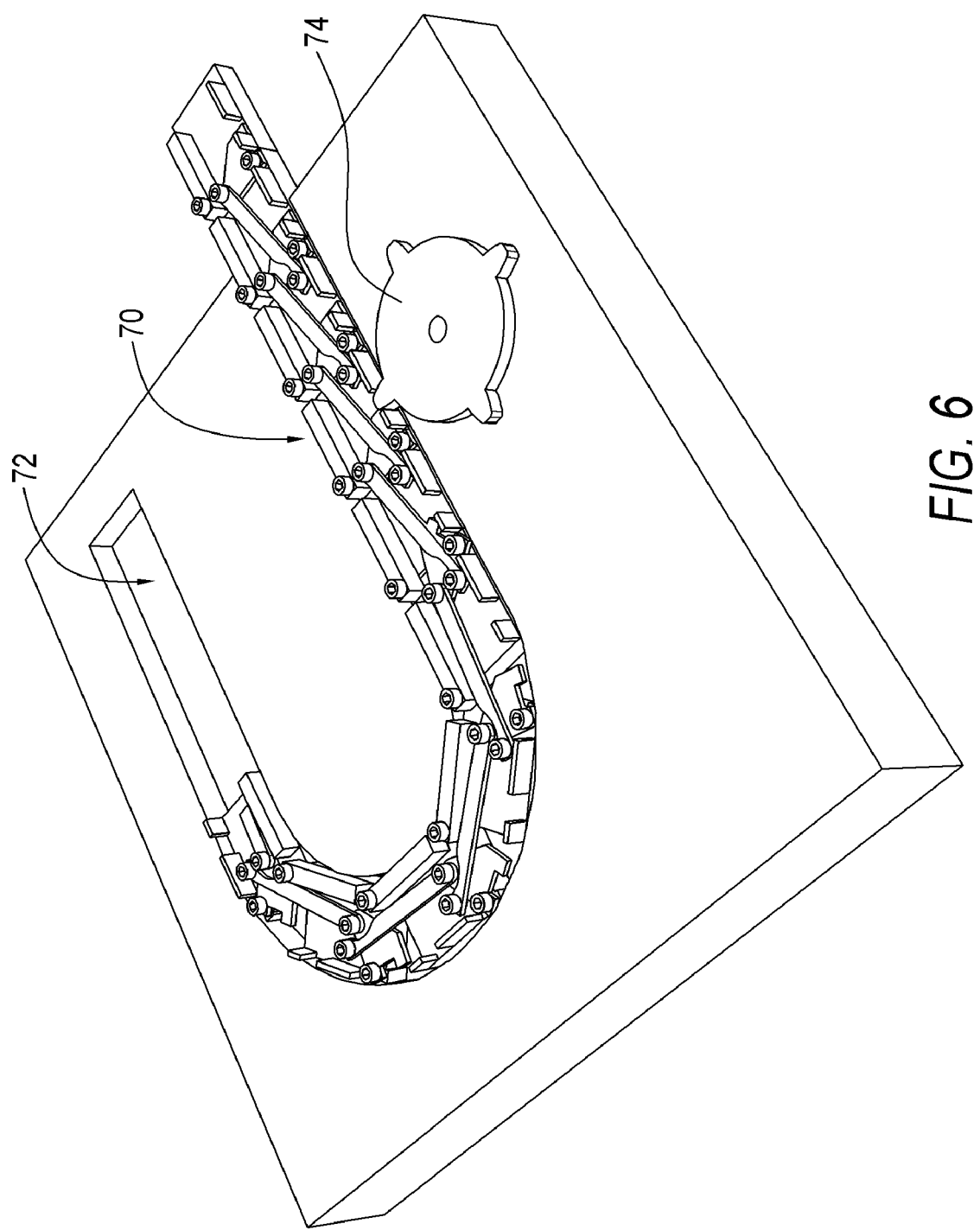
FIG. 6 is a top perspective view of a chain, similar to the type shown in FIG. 1, disposed along an planar chain path.
Figure 7:
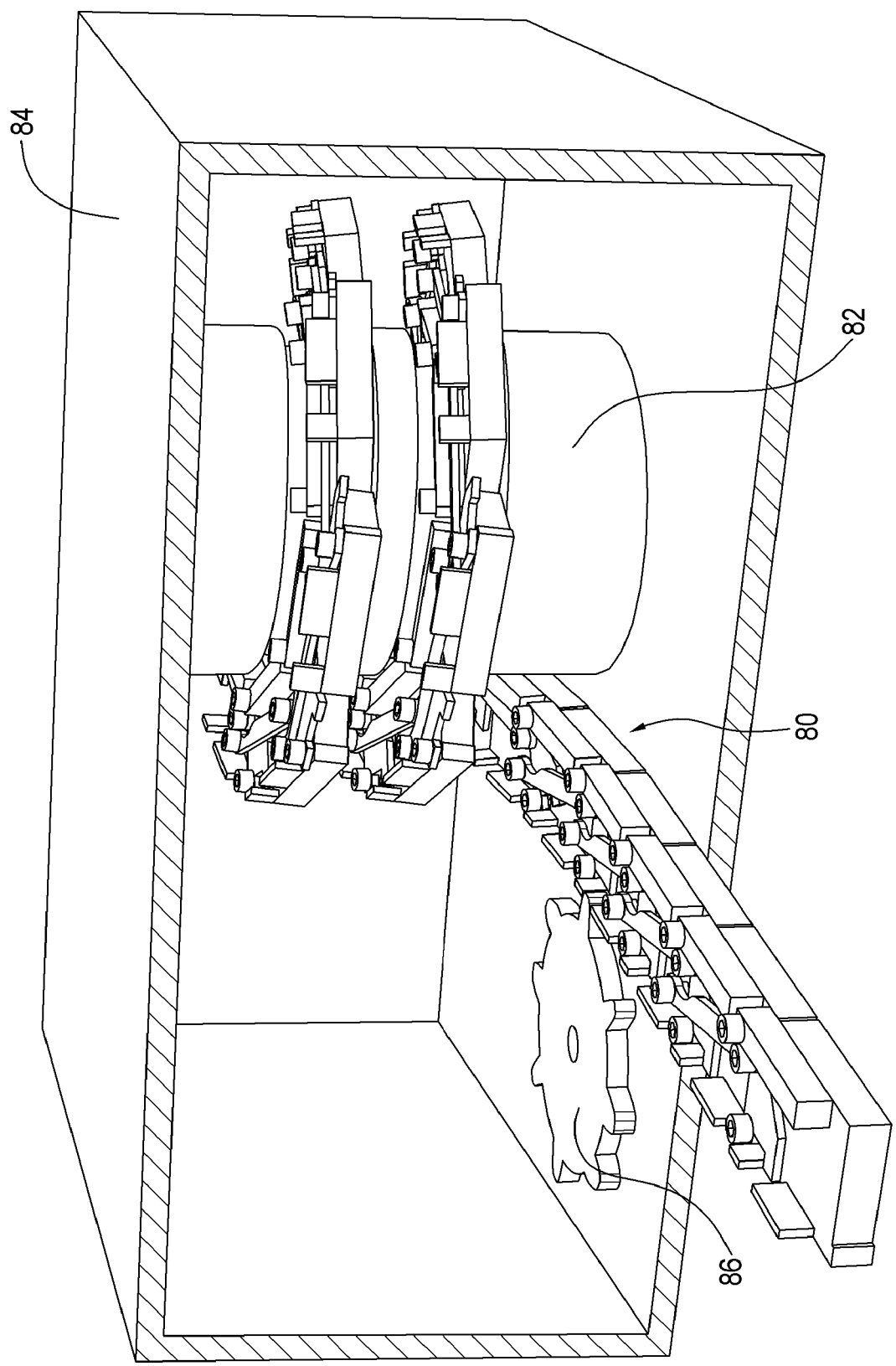
FIG. 7 is a front perspective view of a chain, similar to the type shown in FIG. 1, disposed along a ramped chain path.

Referring to the drawings and first to FIG. 1, this shows a chain 10 for use in a linear actuator as shown in FIGS. 6 and 7. Referring back to FIG. 1, the chain comprises a pair of end links 12 and 14, and a plurality of intermediate links 16a, 16b, 16c, and 16d therebetween. The intermediate links 16a, 16b, 16c, and 16d are substantially identical and accordingly only one of the intermediate links 16a is described in detail herein. The end links 12 and 14 are substantially similar the intermediate links 16a, 16b, 16c, and 16d with the general exception that a proximal one of the ends links 12 does not have male connecting means to connect to an adjacent link, and a distal one of the end links 14 does not have female means to connect to an adjacent link. Accordingly, the end links 12 and 14 are not described herein in detail.

Figure 2:
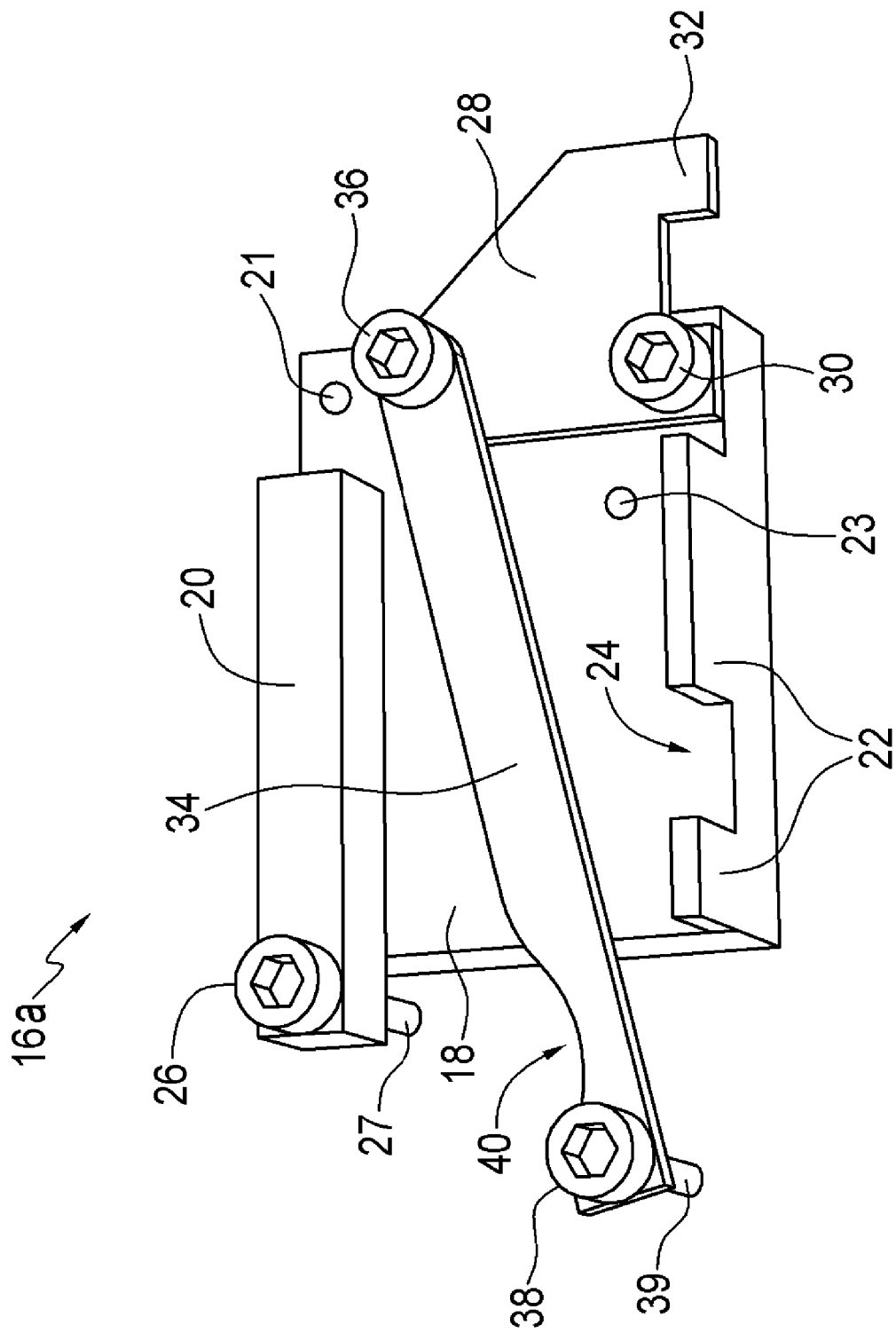
FIG. 2 is a top perspective view showing a link of the chain of FIG. 1.

Referring now to FIG. 2, a first one of the intermediate links 16a is shown in greater detail. The link 16a has a base member 18 which is rectangular in shape in this example. Opposed side walls 20 and 22 extend along longitudinal sides of the base member 18. A first one of the side walls 20 extends beyond one end of the base member 18. There is an opening 24 in a second one of the side walls 22. A first male connecting means 26 is disposed in a portion of the first side wall 20 which extends beyond the end of the base member 18. In this example, the first connecting means 26 includes a pin 27 which engages a corresponding first female connecting means in an adjacent link.

A plate 28 is pivotably mounted on the base member by a pin 30. The plate is pivotable about the pin 30. The plate includes a projection 32 which is shaped to engage an opening in a side wall of an adjacent link. This will be discussed in greater detail below. An arm 34 is pivotably connected to the plate 28 by a pin 36. There is a second male connecting means 38 disposed at a distal end of the arm 34. In this example, the second male connecting means 38 also includes a pin 39 which pivotably engages a corresponding second female connecting means in said adjacent link. There is a lateral recess 40 in the arm.

The pins 27 and 39 can be threaded or pressed into corresponding female apertures. In the case of threaded pins, it is appropriate to use shoulder screws or tubular spacers so the threads may be tightened without compressing moving parts together. The arm 34 and plate 28 need to pivot freely relative to the base member 18 and each other.

The link 16a also includes female connecting means. In this example, a first female connecting means is in the form of an aperture 21 disposed in a corner of the base member 18. A second female connecting means is in the form of an aperture 23 disposed on the body of the base member 18. The female connecting 21 and 23 means allow the link 16a to be engaged by corresponding male engagement means of an adjacent link.

Accordingly, a plurality of links may be inter-connected as shown in FIG. 1. In FIG. 1, the chain 10 is in an extended configuration. The links are aligned along a common longitudinal axis 100 and pivoting of the links is restricted. Pivoting is restricted because a projection on a plate of each link is engaged with a corresponding opening in a second side wall of an adjacent link.

Figure 3:
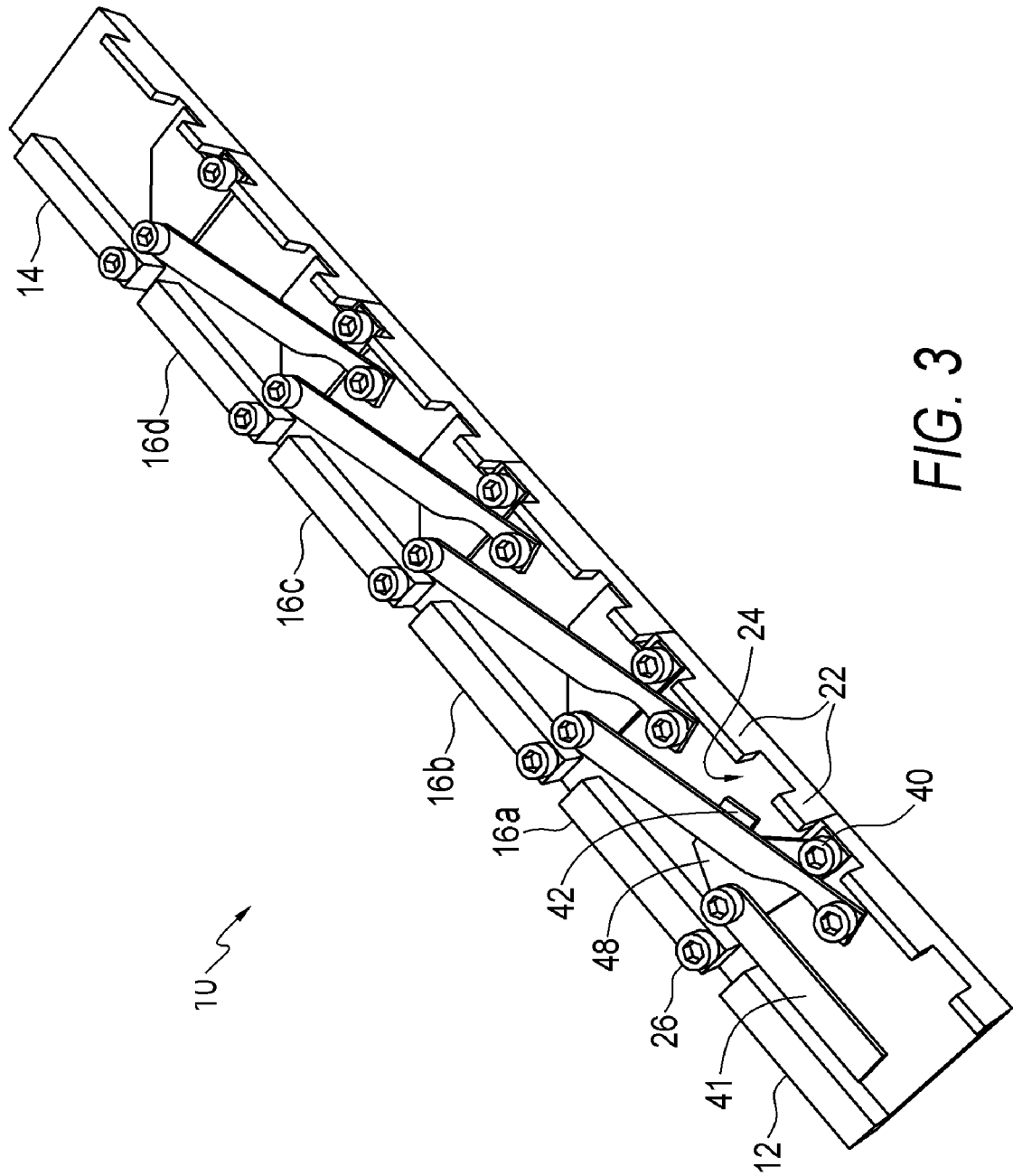
FIG. 3 is a top perspective view of the chain of FIG. 1 showing the chain in extended configuration.
Figure 4:
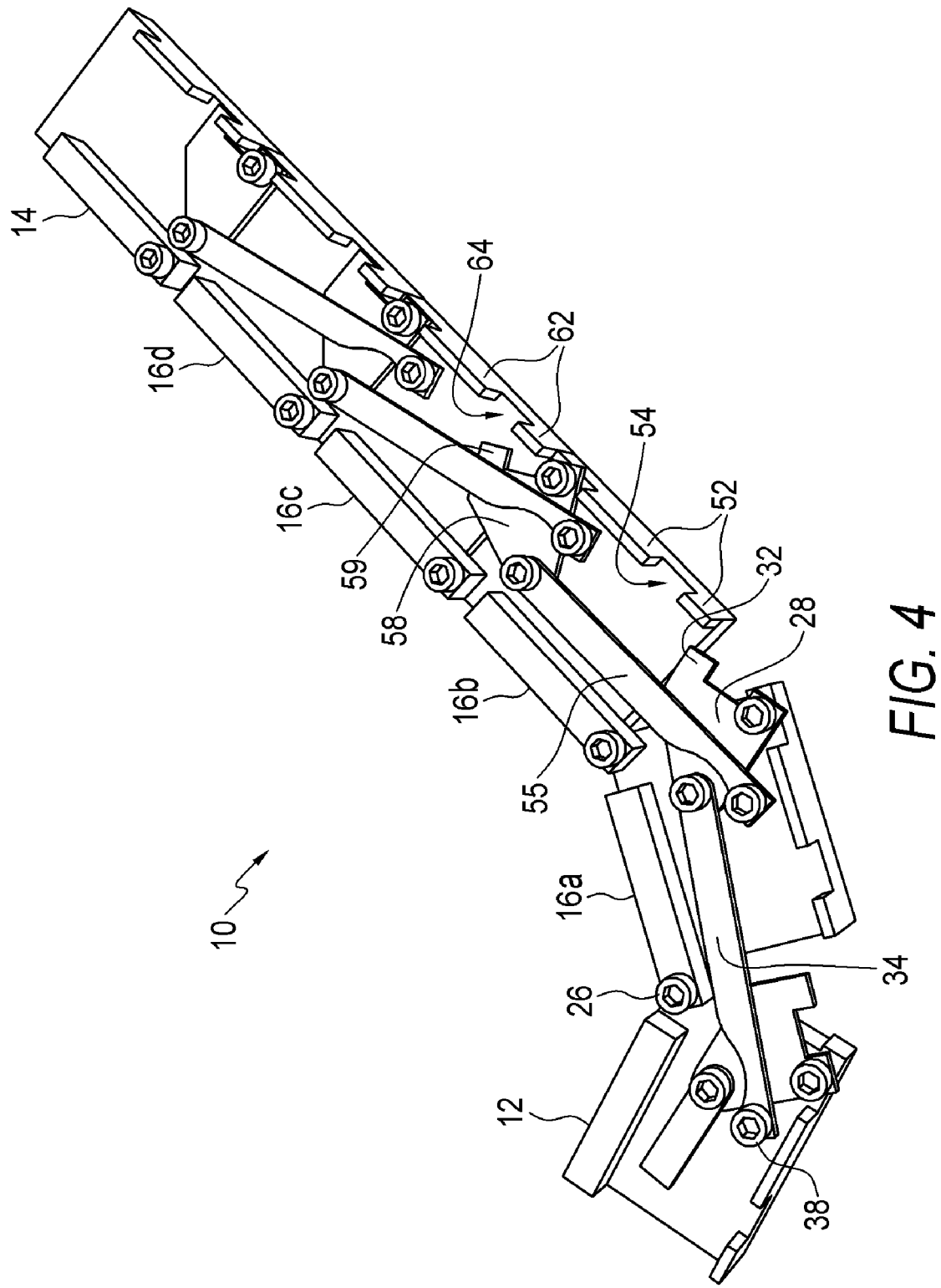
FIG. 4 is a top perspective view of the chain of FIG. 1 showing the chain in a partially looped configuration.

Referring now to FIG. 3, to move the chain 10 from the extended configuration to the looped configuration, an arm 41 of the proximal end link 12 is actuated to cause a plate 48 of the distal end link 12 to pivot about a pin 40. A protrusion 42 in the plate 48 of the proximal end link 12 is thereby disengaged from the opening 24 in the second one of the side walls 22 of the first intermediate link 16a. As best shown in FIG. 4, the proximal end link 12 can now pivot, relative to the first intermediate link 16a, about the first male connecting means 26 of the first intermediate link 16a.

Figure 5:
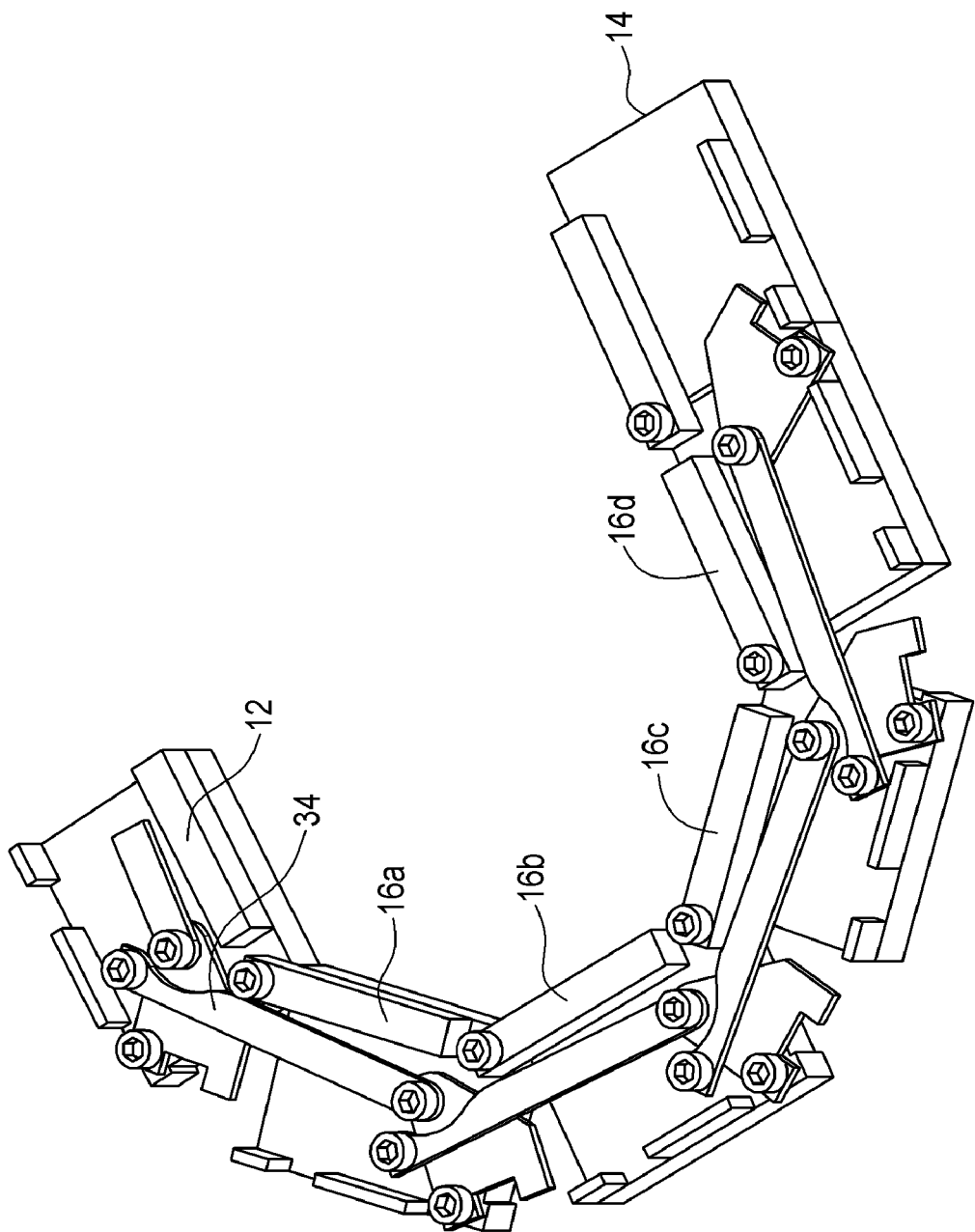
FIG. 5 is a top perspective view of the chain of FIG. 1 showing the chain in a looped configuration.

As the proximal end link 12 pivots, relative to the first intermediate link 16a, a force is applied to the arm 34 of the first intermediate link 16a. This is because the arm 34 of the first intermediate link 16a is connected by its second male connecting means 38 to the proximal end link 12. The force causes the protrusion 32 on the plate 28 of the first intermediate link 16a to disengage with an opening 54 in a side wall 52 of a second one of the intermediate links 16b. This allows the first intermediate link 16a to pivot relative the second intermediate link 16b in a manner similar to as described above for the proximal end link 12. As the first intermediate link 16a pivots, a force is applied to an arm 55 of the second intermediate link 16b. The force causes a protrusion 59 on a plate 58 of the second intermediate link 16b to disengage with the opening 64 in a side wall 62 of a third one of the intermediate links 16c. This enables the second intermediate links 16b to pivot relative to the third intermediate link 16c in a manner similar to as described above for the distal end link 12. This process repeats in series until the chain 10 is moved to the looped configuration shown in FIG. 5.

Considering now the opposite motion, as the links are pivoted back into alignment along the common longitudinal axis 100, the protrusion in the plates of each of the links re-engages the opening in the side wall of a corresponding adjacent link and further pivoting of the links is thereafter restricted. This provides a chain 10 having robust inter-connected links which are pivotably connected, and have a simplified structure to restrict pivoting when the links are aligned along a common longitudinal axis.

Referring now to FIG. 6, this shows a chain 70, similar to the type shown in FIG. 1, disposed along a curved, planar actuator chain path 72. The chain 70 is actuated by a motor driven sprocket 74 which engages the openings in the side walls of the links. The chain 70 is moved by the sprocket 74 between an extended configuration outside the actuator, and looped configuration inside the actuator.

Alternatively and as shown in FIG. 7, a chain 80, similar to the type shown in FIG. 1, may be stored in a plurality of levels about a roller 82 within an actuator housing 84. The concept of helically storage is disclosed in the applicant's co-pending U.S. application Ser. Nos. 12/033,148 and 12/033,173 the complete disclosures of which are incorporated herein by reference. The chain 80 is actuated by a motor driven sprocket 86 which engages the openings in the side walls of the links. The chain 80 is moved by the sprocket 76 between an extended configuration outside the actuator housing 84, and a looped or helically wound configuration inside the actuator housing 84.

Figure 8:
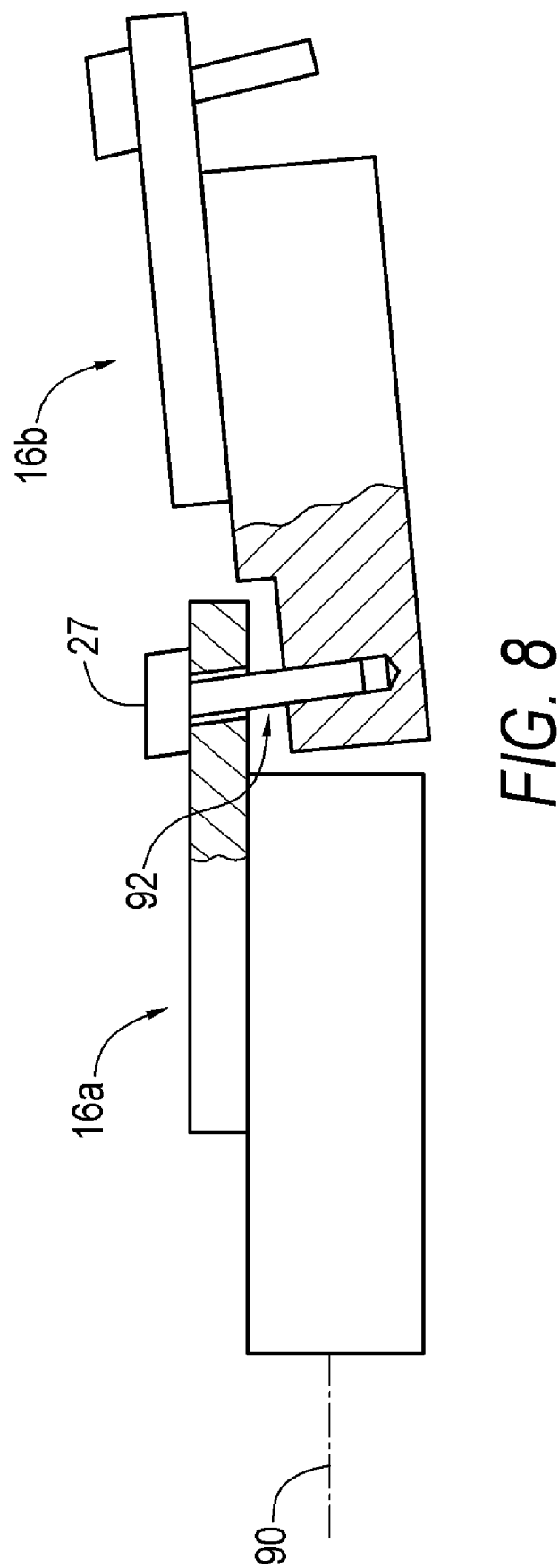
FIG. 8 is a elevation view, partly in section, showing the connection between adjacent links of the chain of shown in FIG. 7.

As disclosed in the applicant's co-pending U.S. application Ser. Nos. 12/033,148 and 12/033,173 and with reference to FIG. 8, to effect helically storage it is necessary the a pivotable pin 27 connecting adjacent links 16a and 16b be tilted at an angle non-perpendicular to the a longitudinal axis 90 of the link 16a. It is also necessary that a gap 90 exist between mating surfaces of the links 16a and 16b. Accordingly, when helical storage is required it the links 16a and 16b are connected as shown in FIG. 8.

It will be understood by a person skilled in the art that in other examples the female and male connecting means may be reversed on the links, i.e. a pin may be provided where there is presently and aperture or an aperture may be provided where there is presently a pin.

It will further be understood by someone skilled in the art that many of the details provided above are by way of example only and are not intended to limit the scope of the invention which is to be determined with reference to the following claim.

What is claimed is:

1. A link for a chain which is used in a linear actuator, the link comprising:
   a base member;
   a plate pivotably mounted on the base member, an arm extending from the plate and a first connecting means being disposed on a distal end of the arm to connect the link with a first adjacent link, the plate having a projection for releasably engaging a second adjacent link; and
   a second connecting means disposed on the base member to connect the link with the second adjacent link.

2. The link as claimed in claim 1 wherein the first connecting means is a pin, the pin being non-perpendicular to a longitudinal axis of the link.

3. The link as claimed in claim 1 wherein the second connecting means is an aperture for receiving a pin of the second adjacent link.

4. The link as claimed in claim 1 further including a side wall extending along a side of the base member wherein the side wall has an opening therein.

5. The link as claimed in claim 1 further including a side wall extending along a side of the base member wherein the side wall extends beyond an end of the base member and a pin is disposed on a portion of the side wall which extends beyond the end of the base member.

6. A chain for a linear actuator comprising:
   a first link having a base member, a pair of opposed side walls extending along sides of the base member of the first link, a first one of the side walls extending beyond an end of the base member of the first link and a connecting means disposed on a portion of the first one of the side walls extending beyond the end of the base member of the first link, a second one of the side walls having an opening therein, an arm extending from the base member of the first link and a connecting means disposed on a distal end of the arm; and
   a second link having a base member, a connecting means disposed on the base member of the second link, a second connecting means disposed on the base member of the second link, and a plate pivotably mounted on the base member of the second link, the plate having a projection for releasably engaging the opening in the second one of the walls of the first;
   wherein the connecting means disposed on the portion of the first one of the side walls extending beyond the end of the base member of the first link engages the first connecting means disposed on the base member of the second link, and the connecting means disposed on the arm extending from the base member of the first link engages the second connecting means disposed on the base member of the second link.

7. A chain for a linear actuator comprising:
   a first link having a base member, a pair of opposed side walls extending along sides of the base member of the first link, a first one of the side walls extending beyond an end of the base member of the first link and a pin disposed on a portion of the first one of the side walls extending beyond the end of the base member of the first link, a second one of the side walls having an opening therein, an arm extending from the base member of the first link and a pin disposed on a distal end of the arm; and a second link having a base member, a first aperture in the base member of the second link, a second aperture in the base member of the second link, and a plate pivotably mounted on the base member of the second link, the plate having a projection for releasably engaging the opening in the second one of the walls of the first;

wherein the pin disposed on the portion of the first one of the side walls extending beyond the end of the base member of the first link engages the first aperture in the base member of the second link, and the pin disposed on the arm extending from the base member of the first link engages the second aperture in the base member of the second link.

* * * * *